US00RE40710E

(19) United States
(12) Reissued Patent
Yokota et al.

(10) Patent Number: US RE40,710 E
(45) Date of Reissued Patent: May 12, 2009

(54) DATA CONVERTER FOR PERFORMING EXPONENTIATION IN POLYNOMIAL RESIDUE CLASS RING WITH VALUE IN FINITE FIELD AS COEFFICIENT

(75) Inventors: Kaoru Yokota, Ashiya (JP); Motoji Ohmori, Hirakata (JP); Masato Yamamichi, Ohta (JP); Masami Yamamichi, legal representative, Ota (JP); Satomi Yamamichi, legal representative, Ota (JP); Keiko Yamamichi, legal representative, Yokohama (JP); Makoto Tatebayashi, Takarazuka (JP); Makoto Usui, Osaka (JP)

(73) Assignee: Panasonic Corporation, Osaka (JP)

(21) Appl. No.: 11/651,088
(22) Filed: Jan. 9, 2007

Related U.S. Patent Documents

Reissue of:
(64) Patent No.: 6,995,692
Issued: Feb. 7, 2006
Appl. No.: 10/952,746
Filed: Sep. 30, 2004

(30) Foreign Application Priority Data

Oct. 14, 2003 (JP) ..... 2003-353439

(51) Int. Cl.
*H03M 5/00* (2006.01)

(52) U.S. Cl. ..... 341/50; 341/59; 341/60; 708/492; 714/751

(58) Field of Classification Search ..... 341/50–90; 708/492; 714/751
See application file for complete search history.

(56) References Cited

U.S. PATENT DOCUMENTS 5,220,568 A 6/1993 Howe et al.
5,532,694 A 7/1996 Mayers et al.
6,202,076 B1 3/2001 Aoki et al.
6,320,520 B1 11/2001 Luby
6,343,305 B1 1/2002 Koc
6,411,223 B1 6/2002 Haken et al.
6,771,197 B1 8/2004 Yedidia et al.
6,831,574 B1 12/2004 Mills et al.
7,243,289 B1 * 7/2007 Madhusudhana et al. ... 714/758

FOREIGN PATENT DOCUMENTS

EP 1 217 750 6/2002

OTHER PUBLICATIONS

Yong Suk Cho et al., "Design of GF($2^m$) multiplier using its subfields",, Electronics Letters, IEE Stevenage, GB, vol. 34, No. 7, Apr. 2, 1998, pp. 650–651, XP006009548.
L. Song et al., "Efficient Finite Field Serial/Parallel Multiplication," Proceedings. International Conference on Application—Specific Systems, Architectures and Processors, Aug. 19, 1996, pp. 72–82, XP000828099.
C. Paar et al., "Fast Arithmetic Architectures for Public–Key Algorithms Over Galois Fields GF(($2^n$)$^m$)", Advances in Cryptology—Eurocrypt. International Conference on the Theory and Application of Cryptographic Techniques, Springer Verlag, DE, May 11, 1997, pp. 363–378, XP000775775.
A. J. Menezes et al., "Handbook of Applied Cryptography", CRC Press, 1997, pp. 252–256 and pp. 400–403.

* cited by examiner

*Primary Examiner*—Lam T Mai
(74) *Attorney, Agent, or Firm*—Wenderoth, Lind & Ponack, L.L.P.

(57) ABSTRACT

A data converter (1) capable of reducing a size of the total implementation in a device is a processing apparatus that performs secret converting processing predetermined to input data with 64 bits, the data converter including a finite field polynomial cubing unit (10), data integrating units (11a) to (11d), (12) and (13), a first converter (14), a second converter (15), a data splitting unit (16), and a data integrating unit (17). The finite field polynomial cubing unit (10) performs cubing, on the 32 bits data, in the polynomial residue class ring with a value in the finite field GF ($2^8$) as a coefficient and respectively outputs data with 32 bits.

16 Claims, 11 Drawing Sheets

DATA CONVERTER FOR PERFORMING EXPONENTIATION IN POLYNOMIAL RESIDUE CLASS RING WITH VALUE IN FINITE FIELD AS COEFFICIENT

Matter enclosed in heavy brackets [ ] appears in the original patent but forms no part of this reissue specification; matter printed in italics indicates the additions made by reissue.

*This is a reissue application of U.S. Pat. No. 6,995,692, issued Feb. 7, 2006.*

BACKGROUND OF THE INVENTION (1) Field of the Invention

The present invention relates to a data converter that realizes a data conversion system used for an authentication system and to a method thereof, in particular to a data converter that can be realized in an especially small size of implementation scale and has a high data confusion and to a method thereof.

(2) Description of the Related Art

In a challenge-response authentication system which is one of a method for examining a validity of a communication partner and the like, a secret conversion system is necessary for both authenticating and authenticated sides. As requirements for the secret conversion system, it is wished not only to have high data confusion performance (avalanche performance) but also to mount the method onto an apparatus at low cost.

As a conventional example of a data conversion system, there is a system of using a secret key encryption system. For example, in the case of where the challenge-response authentication system is realized by a data conversion system using a 56 bits key length Data Encryption Standard (DES) encryption system (for details about the DES encryption system, refer to Menezes, Alfred J., et al., "HANDBOOK of APPLIED CRYPTOGRAPHY", CRC Press, 1997: 252-256), both of the authenticating side and the authenticated side secretly store a 56 bits key of the DES encryption system as an authentication key. Also, a plaintext and encrypted text of the DES encryption system are respectively determined as an input and an output for the data converting system. Accordingly, the DES encryption method can be used for a secret data converting system for an authentication (for details about the authentication system, refer to Menezes, Alfred J., et al., "HANDBOOK of APPLIED CRYPTOGRAPHY", CRC Press, 1997: 400-403).

However, the secret key encryption system such as the DES encryption system is not constructed considering for sharing a circuit with other circuits that are mounted together with an encryption circuit in an apparatus. Therefore, it needs to be mounted as a circuit independent from other circuits. Accordingly, in a data conversion system using the conventional secret key encryption system, an encryption circuit is independently mounted separately from other circuits in the apparatus so that a scale of the circuit in the apparatus as a whole becomes large. That is, in order to realize an apparatus at a low cost, it is generally required to make a total scale of the circuit mounted in the apparatus smaller as possible. Therefore, it is desirable for the encryption circuit mounted in the apparatus to share the circuit with other circuits. However, it is not realized in the conventional structure.

Considering the above mentioned problem, the present invention aims to provide a data converter capable of reducing the total size of the implementation scale in an apparatus.

SUMMARY OF THE INVENTION

A data converter by the present invention comprises: a splitting unit operable to split input data into a plurality of data blocks; a conversion performing unit operable to perform conversion on each one of the plurality of data blocks, the conversion being based on an exponentiation to a predetermined exponent in a polynomial residue class ring with a value in a finite field GF ($2^n$), the n being a natural number, as a coefficient; and an output data generating unit operable to generate output data based on the plurality of data blocks converted by the conversion performing unit, wherein the predetermined exponent is a value that is 3 or larger and other than $2^m$, the m being an integer which is 1 or larger.

According to this structure, in the exponentiation, the multiplication in the polynomial residue class ring is performed. By performing an operation in the polynomial residue class ring, even if a part of the input data is changed as described later, the change affects all bits in the output data. Therefore, the data confusion can be improved. Also, when a multiplication with two or more variables is performed, if any one of the variables is 0, a result of the multiplication becomes 0 regardless of values of other variables and a better data confusion performance is not shown. On the other hand, when an exponentiation of the input data is performed, the data confusion performance can be improved without causing such problems. Furthermore, in the exponentiation, an operation in the polynomial residue class ring with a value in the finite field GF ($2^n$) (n is a natural number) as a coefficient is performed. Additionally, a circuit can be shared with the operational circuit in the finite field GF ($2^n$) used in an error-correction coding circuit such as a Reed-Solomon coding and a Bose-Chaudhuri-Hocqenghem (BCH) coding. Consequently, the size of implementation scale of an apparatus as a whole can be reduced and an apparatus implemented in a compact circuit scale is realized.

As further information about technical background to this application, the disclosure of Japanese Patent Application No. 2003-353439 filed on Oct. 14, 2003 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings.

DESCRIPTION OF THE PREFERRED EMBODIMENT(S)

The following explains about an embodiment of the present invention with references to diagrams.

(Configuration of Authentication System with Data Converter)

Figure 1:
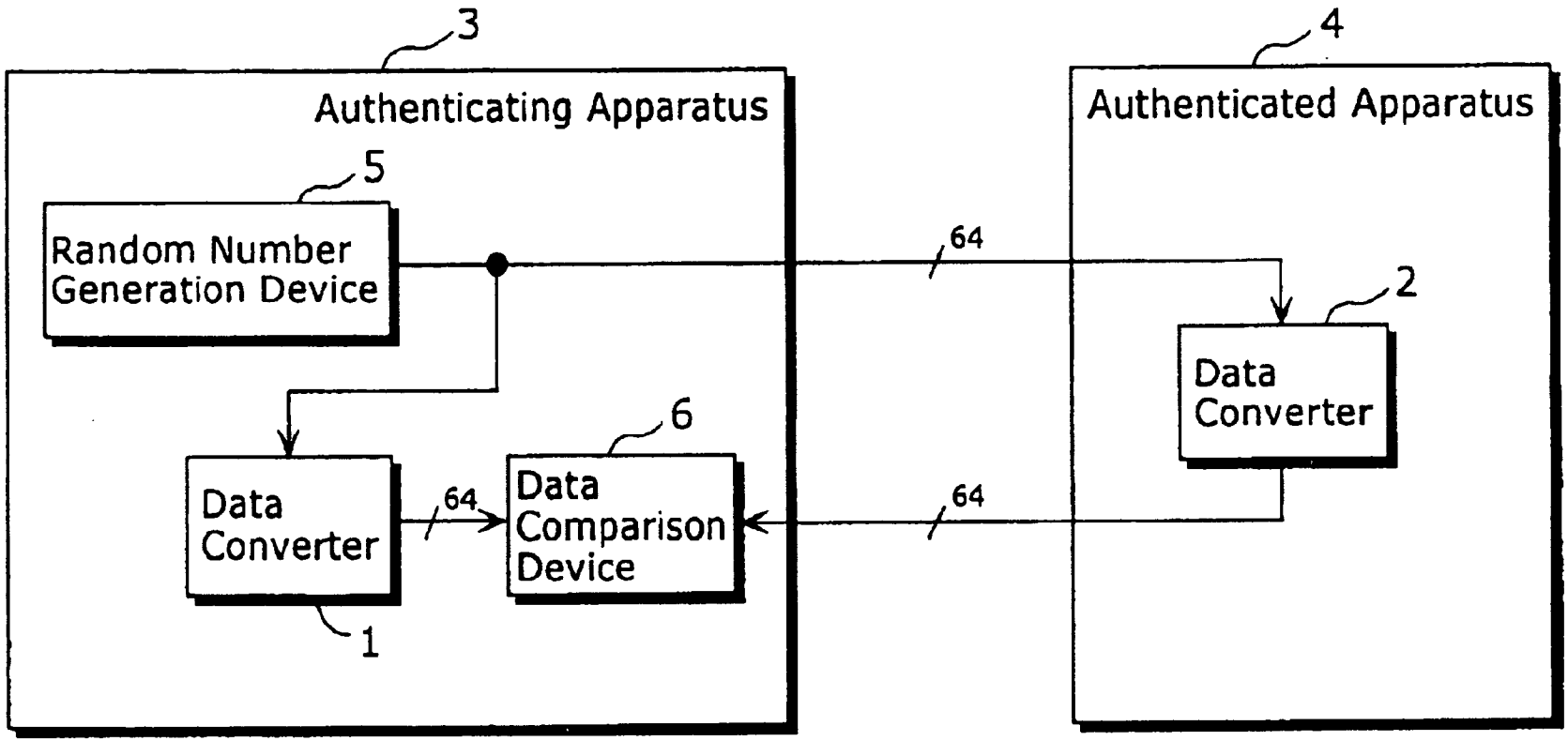
FIG. 1 is a block diagram showing an authentication system according to an embodiment of the present invention.

FIG. 1 is a block diagram showing a configuration of an authentication system according to an embodiment of the present invention. In the authentication system, an authenticating apparatus 3 authenticates an authenticated apparatus 4 by a challenge-response authentication system. As a specific example of the present authentication system, for example, it is represented by a keyless entry system for a car in which the authenticating apparatus 3 is an on-vehicle equipment for controlling open and close of a door of the car and the authenticated apparatus 4 is a portable terminal held by a user for opening and closing the door of the car.

The authenticating apparatus 3 generates random data with 64 bits in a random number generation apparatus 5 and sends it to the authenticated apparatus 4 as challenge data. The authenticated apparatus 4 converts received challenge data in the data converter 2 and sends 64 bits converted data which is a result of the conversion to the authenticating apparatus 3 as response data. The authenticating apparatus 3 converts the random number data in the data converter 1 while the authenticated apparatus 4 is performing the above mentioned processing and generates 64 bits converted data as the result of the conversion. The authenticating apparatus 3 then compares, in a data comparison device 6, the response data received from the authenticated apparatus 4 with the converted data and authenticates the authenticated apparatus 4 as valid only when both data correspond to each other. Here, the data converter 1 in the authenticating apparatus 3 and the data converter 2 in the authenticated apparatus 4 perform the same conversion processing and content of the processing is shared secretly between the authenticating apparatus 3 and the authenticated apparatus 4.

(Configuration of Data Converter 1 and 2)

Whereas the data converters 1 and 2 have a same configuration, the following explains only about an internal configuration of the data converter 1.

Figure 2:
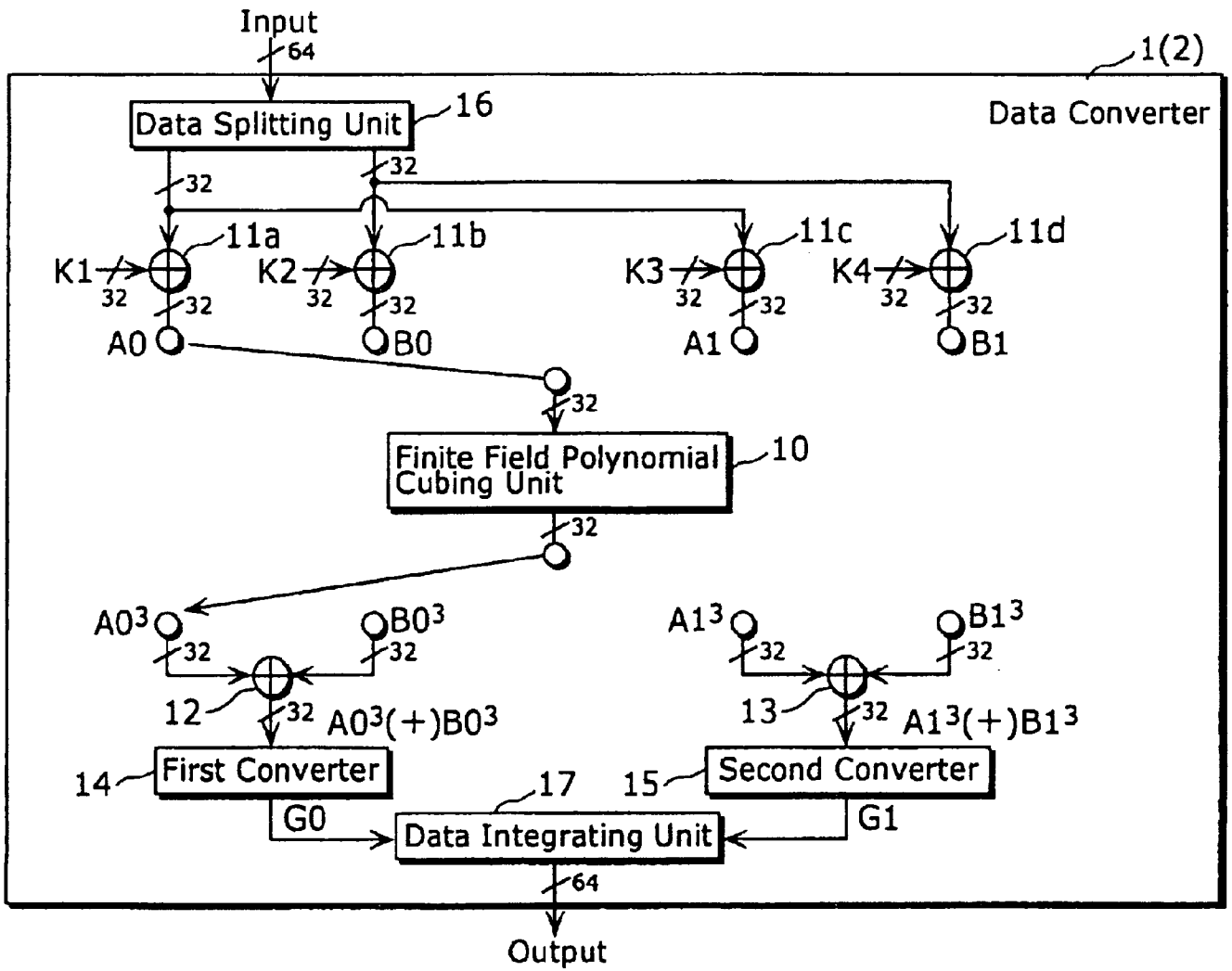
FIG. 2 is a block diagram showing an example of a configuration of a data converter according to the embodiment of the present invention.

FIG. 2 is a diagram showing an internal configuration of the data converter 1. The data converter 1 is a processing apparatus that performs a predetermined secret converting processing on input data with 64 bits and generates output data with 64 bits. It has a finite field polynomial cubing unit 10, a data integrating units 11a–11d, 12 and 13, a first converter 14, a second converter 15, data splitting unit 16, and a data integrating unit 17. The following explains about internal performances when input data with 64 bits is inputted into the data converter 1.

Firstly, the data splitting unit 16 split, from high-ordered bits, the 64 bit input data into two data blocks each having 32 bits. Here, the high-ordered 32 bit data block is called data A and the low-ordered 32 bit data block is called data B. The data A is inputted into the data integrating units 11a and 11c and the data B is inputted into the data integrating units 11b and 11d. The data integrating units 11a and 11c respectively perform exclusive OR operation (XOR), for each bit, on the inputted 32 bit data A with a fixed 32 bits data K1 and K3 and output 32 bit data A0 and A1. Further, the data integrating units 11b and 11d respectively perform the exclusive OR operation (XOR), for each bit, on the 32 bit data B with fixed bit data K2 and K4 and output 32 bit data B0 and B1. Here, the 32 bit data K1 to K4 are fixed values determined in predetermined values.

Next, the finite field polynomial cubing unit 10 cubes each of the 32 bit data A0, B0, A1 and B1 in a polynomial residue class ring with a value in a finite field GF ($2^8$) as a coefficient which is described later and calculates respectively 32 bit data of $(A0)^3$, $(B0)^3$, $(A1)^3$, and $(B1)^3$. The detail about processes of the finite field polynomial cubing unit 10 is explained later.

Next, the 32 bit data $(A0)^3$ and $(B0)^3$ are inputted to the data integrating unit 12 and the 32 bit data $(A1)^3$ and $(B1)^3$ are inputted to the data integrating unit 13.

The data integrating unit 12 and the data integrating unit 13 perform an exclusive OR operation for each bit respectively on two inputted 32 bit data and output 32 bit data of $(A0)^3(+)(B0)^3$ and $(A1)^3(+)(B1)^3$. Here, "X(+Y" means the exclusive OR operation (XOR), for each bit, between X and Y.

The first converter 14 then performs a predetermined conversion on the 32 bit data of $(A0)^3(+)(B0)^3$ based on an operation in a finite field GF ($2^8$) which is explained later and outputs 32 bit data G0. Also, the second converter 15 performs a predetermined conversion on the $(A1)^3(+)(B1)^3$ based on an operation in the finite field GF ($2^8$) and outputs 32 bit data G1.

After the above processes, the data integrating unit 17 connects the 32 bit data G0 as the high-ordered 32 bits and the 32 bit data G1 as the low-ordered 32 bits and outputs the result as 64 bit data. The 64 bit data is output data of the data converter 1. Next, it is explained about an internal configuration and performances of the finite field polynomial cubing unit 10.

(Internal Configuration of Finite Field Polynomial Cubing Unit 10)

Figure 3:
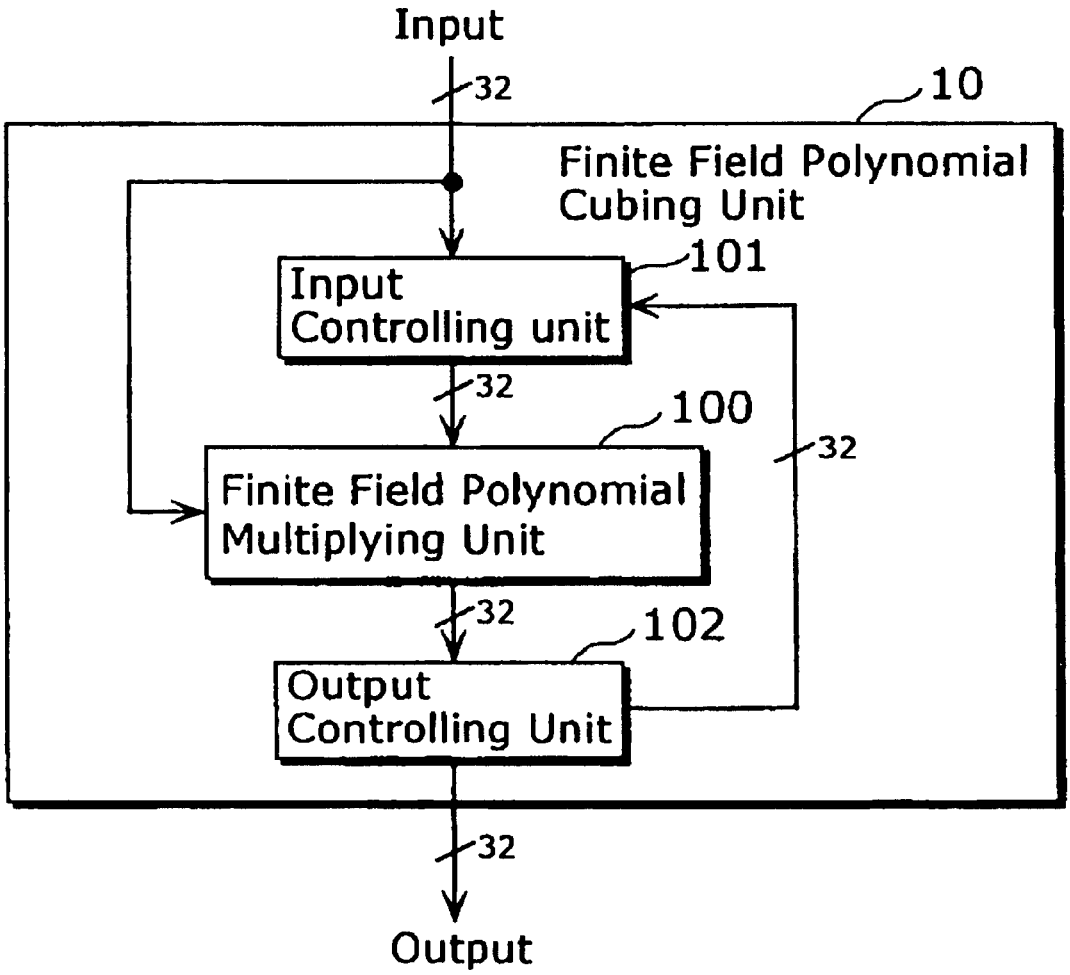
FIG. 3 is a block diagram showing an example of a configuration of a finite field cubing unit according to the embodiment of the present invention.

FIG. 3 is a diagram showing an example of the internal configuration of the finite field polynomial cubing unit 10. The finite field polynomial cubing unit 10 is a processing unit of cubing in the polynomial residue class ring with a value in the finite field GF ($2^8$) as a coefficient. It is composed of an input control unit 101, a finite field polynomial multiplying unit 100 and an output controlling unit 102.

The input controlling unit 101 performs a control so that one of the two blocks of input data is outputted. The finite field polynomial multiplying unit 100 multiplies the two blocks of input data in the polynomial residue class ring with a value in the finite field GF ($2^8$) as a coefficient. The output controlling unit 102 performs a control so that the input data is outputted to one of the two output destinations.

Hereafter, it is explained about internal performances when 32 bit input data X is inputted to the finite field polynomial cubing unit 10. The input data X is inputted to the input controlling unit 101 and the finite field polynomial multiplying unit 100. The input control unit 101 inputs the input data X directly to the finite field polynomial multiplying unit 100. The finite field polynomial multiplying unit 100 multiplies the 32 bit data X inputted from outside and the 32 bit data X inputted from the input controlling unit 101 in the polynomial residue class ring with a value in the finite field GF ($2^8$) as a coefficient (details are explained later), outputs the multiplication result $X^2$, and inputs it to the output controlling unit 102. It is explained later about the detailed processes of the finite field polynomial multiplying unit 100.

The output controlling unit 102 inputs the input data $X^2$ directly to the input controlling unit 101. The input controlling unit 101 then inputs the input data $X^2$ to the finite field polynomial multiplying unit 100.

The finite field polynomial multiplying unit 100 multiplies the input data $X^2$ and the input data X and inputs the product $X^3$ to the output controlling unit 102. The multiplication herein is a multiplication in the polynomial residue class ring as described above.

The output controlling unit 102 outputs the input data $X^3$ as output data of the finite field polynomial cubing unit 10. Next, it is explained about an internal configuration and performances of the finite field polynomial multiplying unit 100.

(Internal Configuration of Finite Field Polynomial Multiplying Unit 100)

Figure 4:
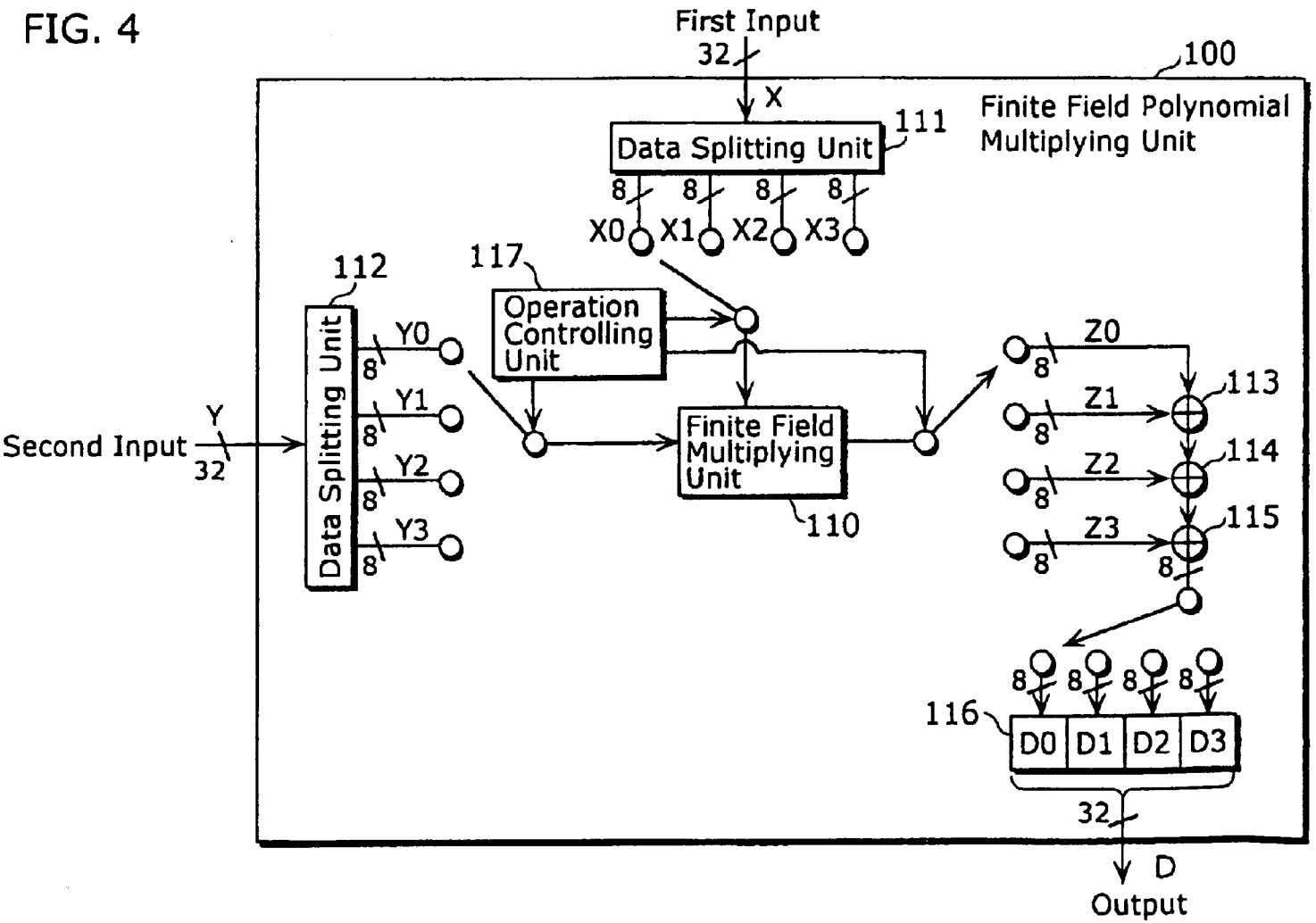
FIG. 4 is a block diagram showing an example of a configuration of a finite field polynomial multiplying unit according to the embodiment of the present invention.

FIG. 4 is a diagram showing an example of the internal structure of the finite field polynomial multiplying unit 100. The finite field polynomial multiplying unit 100 multiplies the 32 bit first input data X and the 32 bit second input data Y in the polynomial residue class ring with a value in the finite field GF ($2^8$) as a coefficient and outputs an output data D with 32 bits. A residual polynomial of the polynomial residue class ring herein is denoted $L(X)=X^4-1$ and a primitive polynomial m(x) of the finite field GF ($2^8$) is denoted $m(x)=x^8+x^4+x^3+x+1$. Prior to an explanation about performances of the finite field polynomial multiplying unit 100, it is explained briefly about an operation in the finite field GF ($2^8$) and an operation in the polynomial residue class ring.

Firstly, it is explained about the operation in the finite field GF ($2^8$). For the operation in the finite field GF ($2^8$), if a value of each bit of the 8 bit data A is denoted a7, a6, . . . , a0 from a high-ordered bit, a polynomial of the seventh order $a(x)=a7\times x^7+a6\times x^6+\ldots+a1\times x+a0$ is considered by associating with the values. Similarly, denoting a value of each bit of the 8 bit data b7, b6, . . . , b0 from a high-ordered bit, a polynomial of the seventh order $b(x)=b7\times x^7+b6+x^6+\ldots+b1\times x+b0$ is considered by associating with the values. Herein, the sum C of A and B in the finite field GF ($2^8$) is a result of which the sum c(x) calculated c(x)=a(x)+b(x) in the finite field GF (2) is converted into 8 bit data by associating the 8 bit data with the polynomial of the seventh order which is described above. That is, taking $c(x)=c7\times x^7+c6+x^6+\ldots c1\times x+c0$, it is obtained as follow:

$$c7=a7+b7$$

$$c6=a6+b6$$

$$\ldots$$

$$c1=a1+b1$$

$$c0=a0+b0$$

Here, an addition "+" between the 1 bit data and the 1 bit data is all performed in the finite field GF (2). That is, 0+0=1+1=0 and therefore calculated as 0+1=1+0=1.

From the above, the addition in the finite field ($2^8$) is nothing but performing an exclusive OR operation for each bit. In other words, the result C of the sum of A and B is denoted C=A(+)B.

Next, a multiplication in the finite field GF ($2^8$) is explained. As described above, when 8 bit data A, B and C are denoted as the seventh order polynomials a(x), b(x) and c(x), the result C of multiplying 8 bit data A and B is obtained by following equation using corresponding seventh order polynomials a(x), b(x) and c(x).

$$c(x)=a(x)\times b(x) \bmod m(x)$$

Here, "f(x) mod g(x)" is a residual calculation result of residual calculation f(x) modulo g(x) and m(x) is, as described before, a primitive polynomial $m(x)=x^8+x^4+x^3+x+1$ in the finite field GF($2^8$). Also, the polynomial multiplication herein, an addition and a multiplication of coefficients by residual calculation, are calculated in the finite field GF (2). The addition in the finite field GF (2) is as described and the multiplication is given 0×0=0×1=1×0=0, 1×1=1.

An example of the multiplication is explained. Given A=57 (hexadecimal) and B=83 (hexadecimal), $a(x)=x^6+x^4+x^2+x+1$ and $b(x)=x^7+x+1$. Then, $a(x)\times b(x)=x^{13}+x^{11}+x^9+x^8+x^6+x^5+x^4+x^3+1$ and so $a(x)\times b(x) \bmod m(x)=x^7+x^6+1$. Therefore, the result C of multiplying A and B is hexadecimal C1.

Next, it is explained about an operation in the polynomial residue class ring with a value in the finite field GF ($2^8$) as a coefficient. In an operation in the polynomial residue class ring, when each byte of the 32 bit data A is denoted A0, A1, A2 and A3 from the high-ordered byte, 1 byte data A0 to A3 are applied to the third order polynomial $A(X)=A0+A1\times X+A2\times X^2+A3\times X^3$. Similarly, when each byte of 32 bit data B and C are respectively denoted B0, B1, B2, B3 and C0, C1, C2 and C3, the 1 byte data B0 to B3 and C0 to C3 are respectively applied to the following polynomials of $B(X)=B0+B1\times X+B2\times X^2+B3\times X^3$ and $C(X)=C0+C1\times X+C2\times X^2+C3\times X^3$. Herein, the addition in the polynomial residue class ring is obtained by C(X)=A(X)+B(X). The addition of polynomial coefficients herein is an addition in the finite field GF ($2^8$) as explained above. In other words, the addition of 32 bit data A and B can be obtained only performing an exclusive OR operation for each bit.

Next, the multiplication in the polynomial residual class ring is explained. Given 32 bit data C as the result of multiplying the 32 bit data A and B, as explained above, when each data is applied to the third order polynomials A(X), B(X) and C(X), the multiplication in the polynomial residue class ring is expressed as the following polynomial operation:

$$C(X)=A(X)\times B(X) \bmod L(X)$$

Here, L(X) is, as explained, $L(X)=X^4-1$ and the addition and multiplication of the polynomial coefficients are calculated in the finite field GF ($2^8$). Therefore, the above equation is calculated as follows:

$$C(X)=A0\times B0+(A0\times B1+A1\times B0)\times X+(A0\times B2+A2\times B0+A1\times B1)\times X^2+(A0\times B3+A1\times B2+A2\times B1+A3\times B0)\times X^3+(A1\times B3+A3\times B1+A2\times B2)\times X^4+(A2\times B3+A3\times B2)\times X^5+(A3\times B3)\times X^6 \pmod{X^4-1}$$

Herein, $X4=1 \pmod{X^4-1}$ so that the above equation can be modified further as follows:

$$C(X)=(A0\times B0+A3\times B1+A2\times B2+A1\times B3)+(A1\times B0+A0\times B1+A3\times B2+A2\times B3)\times X+(A2\times B0+A1\times B1+A0\times B2+A3\times B3)\times X^2+(A3\times B0+A2\times B1+A1\times B2+A0\times B3)\times X^3$$

Therefore, C can be calculated as follows:

$$C0=A0\times B0+A3\times B1+A2\times B2+A1\times B3$$

$$C1=A1\times B0+A0\times B1+A3\times B2+A2\times B3$$

$$C2=A2\times B0+A1\times B1+A0\times B2+A3\times B3$$

$$C3=A3\times B0+A2\times B1+A1\times B2+A0\times B3$$

The addition "+" and the multiplication "×" herein are operated in the finite field GF ($2^8$).

With that, the explanation about the operations in the polynomial residue class ring and in the finite field GF ($2^8$) is closed. Then, it is now explained about a performance of the finite field polynomial multiplying unit 100.

The finite field polynomial multiplying unit 100 is a processing unit which multiplies two blocks of input data in the polynomial residue class ring with a value in the finite field GF ($2^8$) as a coefficient. It is composed of a finite field multiplying unit 110, data splitting units 111 to 112, data adding units 113 to 115, a data integrating unit 116, and an operation controlling unit 117.

The finite field multiplying unit 110 performs multiplication in the finite field GF ($2^8$). Each of the data splitting units 111 and 112 splits 32 bit input data into four blocks of data each having 8 bits. Each of the data adding units 113 to 115 adds two input data in the finite field GF ($2^8$). The data integrating unit 116 integrates four blocks of 8 bit data and outputs them as 32 bit data. The operation controlling unit 117 performs input control of multiplicands and multipliers inputted from the data splitting unit 111 and the data splitting unit 112 to the finite field multiplying unit 110 and output destination control of data outputted from the finite field multiplying unit 110. Hereafter, it is explained about performances of the finite field polynomial multiplying unit 100.

The data splitting unit 111 splits the first input data with 32 bits, from a high-ordered byte, into four blocks of data having 8 bits each. Here, the four data blocks are denoted, from the high order byte, X0, X1, X2 and X3. The data splitting unit 112 similarly splits the second input data with 32 bits, from the high-ordered byte, into four blocks of data having 8 bits each. Here, the four blocks of data are denoted, from the high-ordered byte, Y0, Y1, Y2 and Y3. Hereafter, the operation controlling unit 117 controls input and output data when necessary and the finite field multiplying unit 110 and the data adding units 113 to 115 are calculates the bit data D0, D1, D2 and D3 according to the following equations (1) to (4).

$$D0=X0\times Y0+X3\times Y1+X2\times Y2+X1\times Y3 \quad (1)$$

$$D1=X1\times Y0+X0\times Y1+X3\times Y2+X2\times Y3 \quad (2)$$

$$D2=X2\times Y0+X1\times Y1+X0\times Y2+X3\times Y3 \quad (3)$$

$$D3=X3\times Y0+X2\times Y1+X1\times Y2+X0\times Y3 \quad (4)$$

Note that all of the multiplications "×" and the additions "+" are operated in the finite field GF ($2^8$). The reason why the above equations indicate the product of data X and data Y is as explained above.

It is now explained only about performances of the finite polynomial multiplying unit 100 for calculating the data D0. The data D1 to D3 are calculated by the similar performances.

The operation controlling unit 117 selects, as inputs to the finite field multiplying unit 110, data X0 from the data X0 to X3 and data Y0 from the 8 bit data Y0 to Y3. The finite field multiplying unit 110 multiplies data X0 and data Y0 in the finite field GF ($2^8$) and outputs the multiplication result as data Z0. That is, $$Z0=X0\times Y0$$

is calculated.

Next, by similar performances, the finite field multiplying unit 110 multiplies data X3 and Y1 in the finite field GF ($2^8$) and outputs the calculation result as data Z1. That is, $$Z1=X3\times Y1$$

is calculated. Similarly, $$Z2=X2\times Y2$$

$$Z3=X1\times Y3$$

are calculated.

After outputting the Z0 to Z3, the data adding units 113 to 115 add data Z0 to Z3 in the finite field GF ($2^8$). That is, $$D0=Z0+Z1+Z2+Z3$$

is calculated. Note that the addition in the finite field GF ($2^8$) is no other than the exclusive OR operation for each bit itself. Therefore, the above calculations equal to perform the exclusive OR operation on the data Z0 to Z3 for each bit value. Similarly, the data adding units 113 to 115 are obtained by calculating the following equations:

$$D1=X1\times Y0+X0\times Y1+X3\times Y2+X2\times Y3$$

$$D2=X2\times Y0+X1\times Y1+X0\times Y2+X3\times Y3$$

$$D3=X3\times Y0+X2\times Y1+X1\times Y2+X0\times Y3$$

The data integrating unit 116 connects data D0, D1, D2 and D3 from the high-ordered byte and outputs the 32 bit data D as output data of the finite field polynomial multiplying unit 100.

Next, it is explained about an internal configuration and performances of the first converter 14.

(Internal Structure of First Converter 14)

Figure 5:
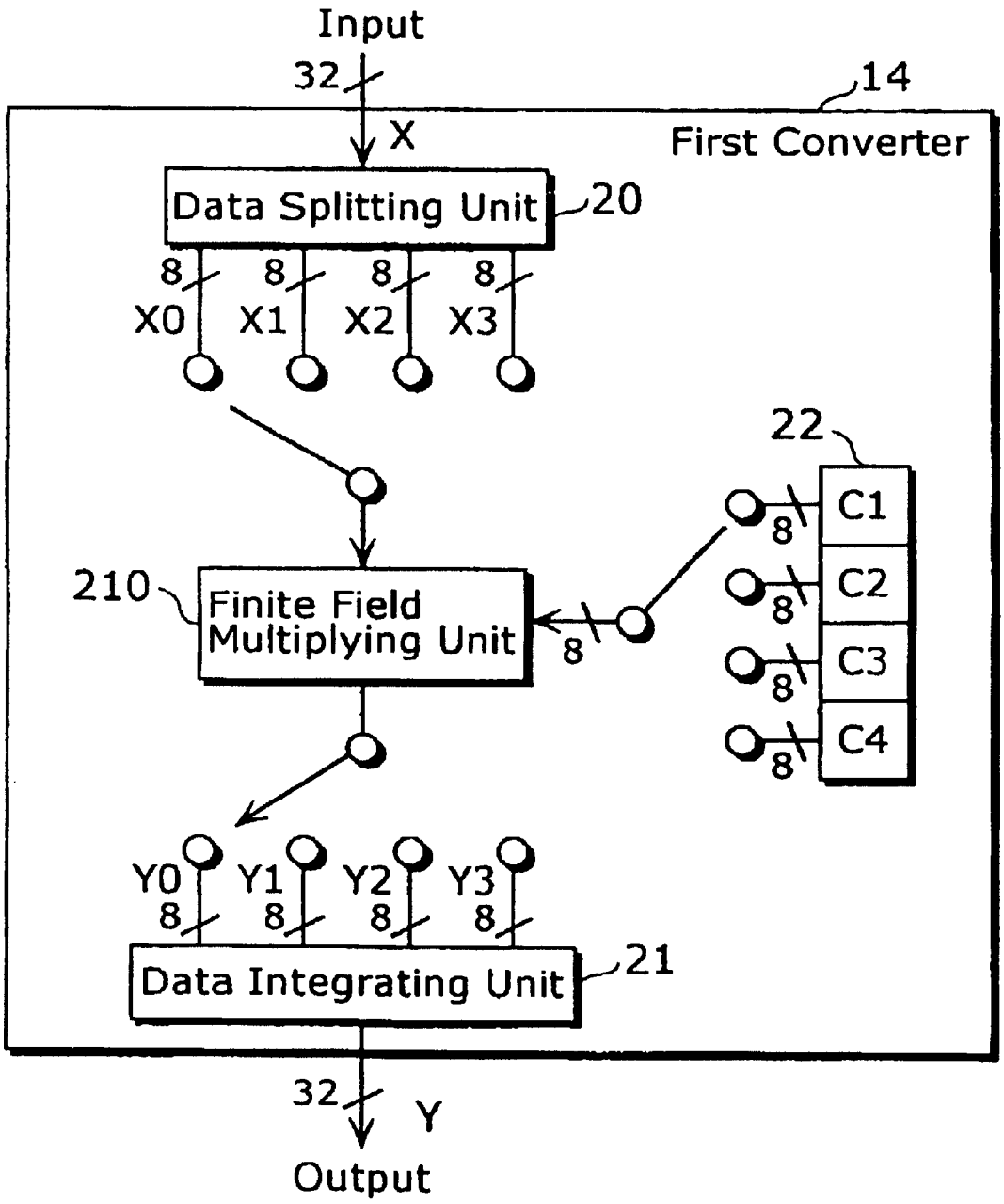
FIG. 5 is a block diagram showing an example of a configuration of a first converter according to the embodiment of the present invention.

FIG. 5 is a diagram showing an example of the internal configuration of the first converter 14.

The first converter 14 is a processing unit which performs a predetermined conversion on the 32 bit input data X using an operation in the finite field GF ($2^8$) and outputs the 32 bit output data Y. It is composed of a data splitting unit 20, a data integrating unit 21, a constant storing unit 22 and a finite field multiplying unit 210. The data splitting unit 20 splits the 32 bit input data into four blocks of 8 bit data. The data integrating unit 21 integrates the four blocks of 8 bit data and outputs them as the 32 bit data. The constant storing unit 22 stores four 8 bit constants C1 to C4. The finite field multiplying unit 210 multiplies the two blocks of 8 bit input data in the finite field GF ($2^8$) and outputs 8 bit output data. Hereafter, it is explained about performances of the first converter 14 are explained.

The data splitting unit 20 splits the 32 bit input data, from the high-ordered byte, into blocks of data having 8 bits each. Here, 8 bit data after the split is denoted data X0, X1, X2 and X3 from the high-ordered byte. The finite field multiplying unit 210 multiplies the data X0 and the 8 bit constant C1 stored in the constant storing unit 22 in the finite field GF ($2^8$) and outputs the result as output data Y0. Similarly, the finite field multiplying unit 210 i) multiplies the data X1 and the constant C2 and outputs as data Y1, ii) multiplies the data X2 and the constant C3 and outputs as data Y2, and iii) multiplies the data X3 and the constant C4 and outputs as data Y3. According to the series of performances following equations are calculated:

$$Y0=C1\times X0$$

$$Y1=C2\times X1$$

$$Y2=C3\times X2$$

$$Y3=C4\times X3$$

Note that all of the multiplications "×" are calculated in the finite field GF ($2^8$).

After the processing, the data integrating unit 21 connects data Y0, Y1, Y2 and Y3 from the high-ordered byte and outputs the 32 bit data Y as output data of the first converter 14.

(Internal Configuration of Second Converter 15)

Figure 6:
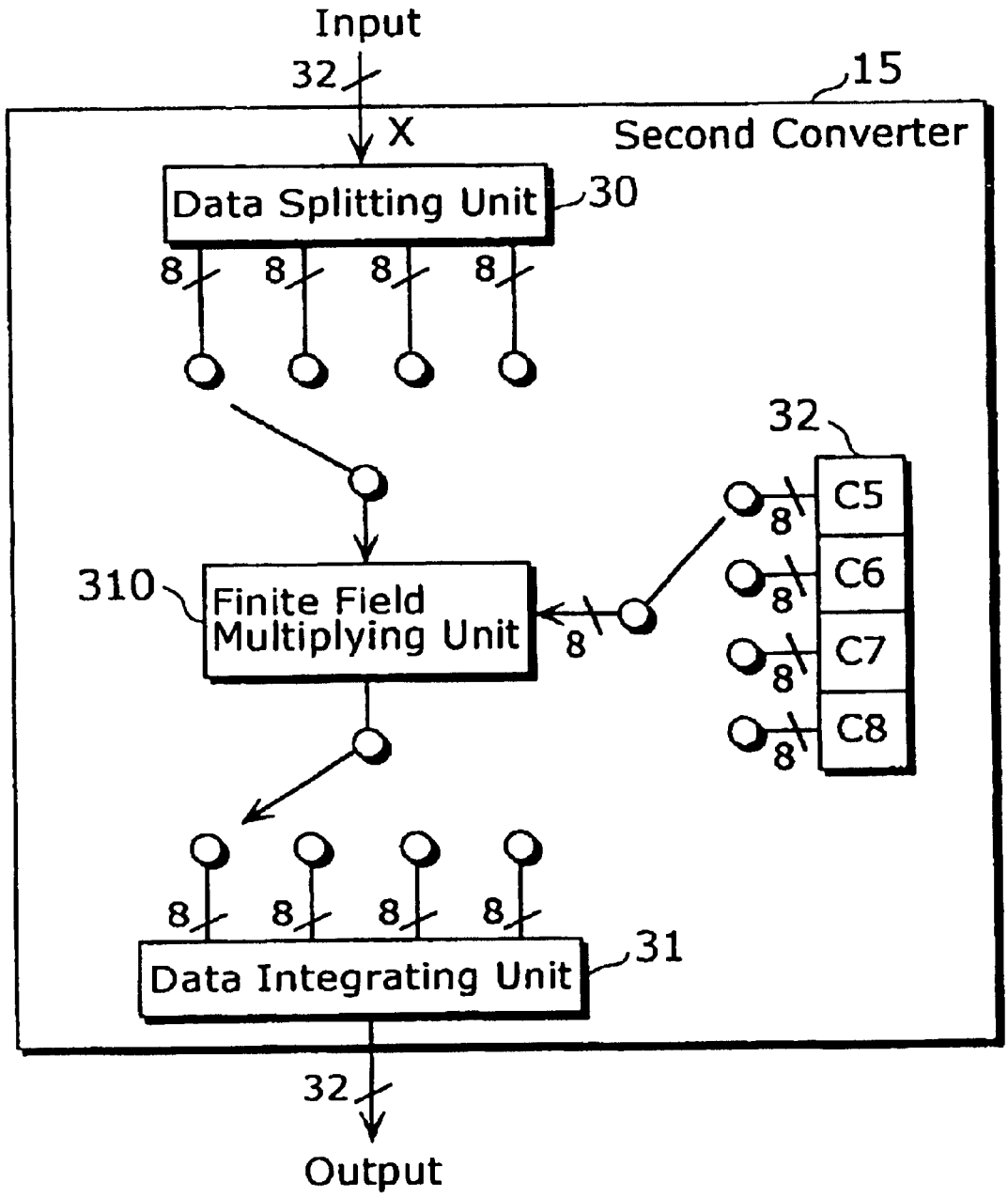
FIG. 6 is a block diagram showing an example of a configuration of a second converter according to the embodiment of the present invention.

As shown in FIG. 6, for the internal configuration of the second converter 15, the constants stored in the constant storing unit 32 C1, C2, C3 and C4 in the first converter 14 are respectively changed to C5, C6, C7 and C8 in the second converter 15. Otherwise, other internal configurations and performances of the second converter 15 are same as of the first converter 14. Therefore, the explanations for the details are not repeated in here.

Figure 7:
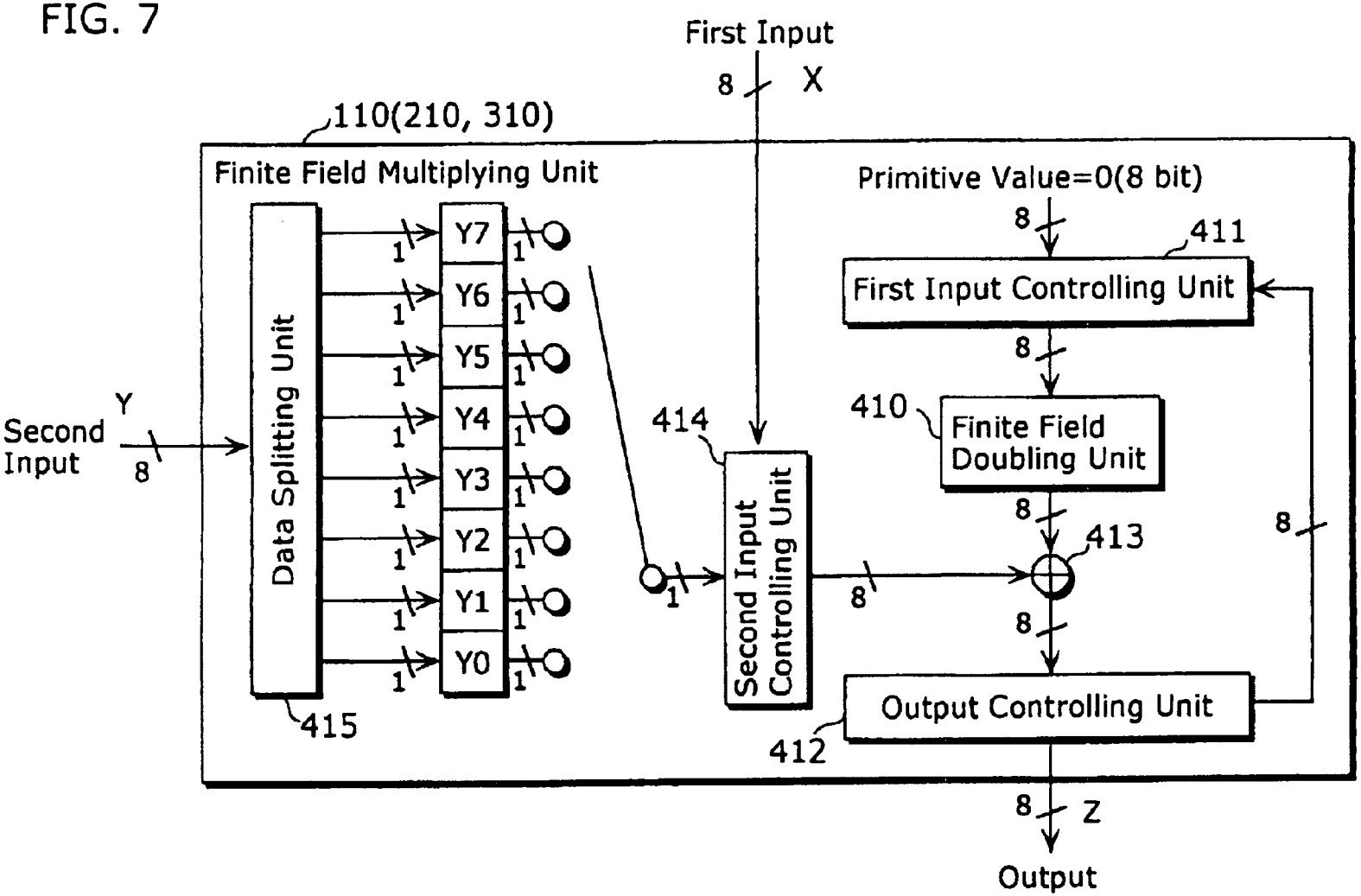
FIG. 7 is a block diagram showing an example of a configuration of a finite field multiplying unit according to the embodiment of the present invention.

Next, with reference to FIG. 7, it is explained about the internal configurations and performances of the finite field multiplying units 110, 210 and 310.

(Internal Configurations of the Finite Field Multiplying Units 110, 210 and 310)

The finite field multiplying units 110, 210 and 310 have same internal configuration and perform same performance. Therefore, the performance of the finite field multiplying unit 110 is only explained in here. Whereas the multiplication method in the finite field GF ($2^8$) is as explained above, the configuration for realizing the calculation in a circuit compact in size is explained in here.

The finite field multiplying unit 110 is a processing unit which multiplies the first 8 bit input data X and the second 8 bit input data Y in the finite field GF ($2^8$) and outputs 8 bit output data Z. It is composed of a first input controlling unit 411, a second input controlling unit 414, an output controlling unit 412, a finite field doubling unit 410, a data integrating unit 413, and a data splitting unit 415.

Each of the first input controlling unit 411 and the second input controlling unit 414 performs control for selecting either one of the two input data blocks and outputting the selected data block. The finite field doubling unit 410 doubles the input data in the finite field GF ($2^8$). The data integrating unit 413 integrates two input data. The data splitting unit 415 splits the input data into a plurality of data. Hereafter, it is explained about performances of the finite field multiplying unit 110.

First, the data splitting unit 415 splits 8 bit second input data Y into one bit each from the high-ordered bit and each value is denoted Y7, Y6, . . . , and Y0. Then, the following processes (1) to (5) are repeated in the order of i=7, 6, 5, 4, 3, 2, 1 and 0.

(1) The first input controlling unit 411 inputs, into the finite field doubling unit 410, an initial value=0 of the 8 bits when i=7 and inputs 8 bit data to be outputted from the output controlling unit 412 when i≠7.

(2) The finite field doubling unit 410 doubles the 8 bit data inputted from the first input controlling unit 411 in the finite field GF ($2^8$) and inputs the 8 bit data which is the result into the data integrating unit 413.

(3) The second input controlling unit 414 inputs, into the data integrating unit 413, 8 bit constant 0 when Yi (i=7, 6, . . . , 0) or the first input data X for other cases.

(4) The data integrating unit 413 performs exclusive OR operation for each bit on the 8 bit data inputted from the finite field doubling unit 410 and the 8 bit data inputted from the second input controlling unit 414 and inputs the 8 bit data resulting from the operation into the output controlling unit 412.

(5) The output controlling unit 412 inputs, for given i≠0, the 8 bit data inputted from the data integrating unit 413 into the first input controlling unit 411. After that, the value of i is reduced only 1 and the processing is restarted from the process (1). For given i=0, the output controlling unit 412 outputs the 8 bit data inputted from the data integrating unit 413 as output data of the finite field multiplying unit 110. Then, the block of processes is terminated.

It is briefly explained about the reason why the multiplication of the first input data X and the second input data Y can be calculated through the above mentioned processes.

Taking values Y7, Y6, . . . , and Y0 for each bit, the second input data is denoted:

$$Y=Y7\times 2^7+Y6\times 2^6+\ldots+Yi\times 2^i+\ldots+Y0$$

So, $$\begin{aligned} X\times Y &= X\times(Y7\times 2^7+Y6\times 2^6+\ldots+Yi\times 2^i+\ldots Y0) \\ &= (\ \ldots\ (((((0+X+Y7)\times 2+X\times Y6)\times 2+X\times Y5)\times \\ &\quad 2+X+Y4)\times 2+X+Y3)\ \ldots\ )\times 2+X+Y0 \end{aligned}$$

This equation is a basis of the above mentioned processes.

Next, it is explained about an internal configuration and performances of the finite field doubling unit 410.

(Internal Configuration of Finite Field Doubling Unit 410)

Figure 8:
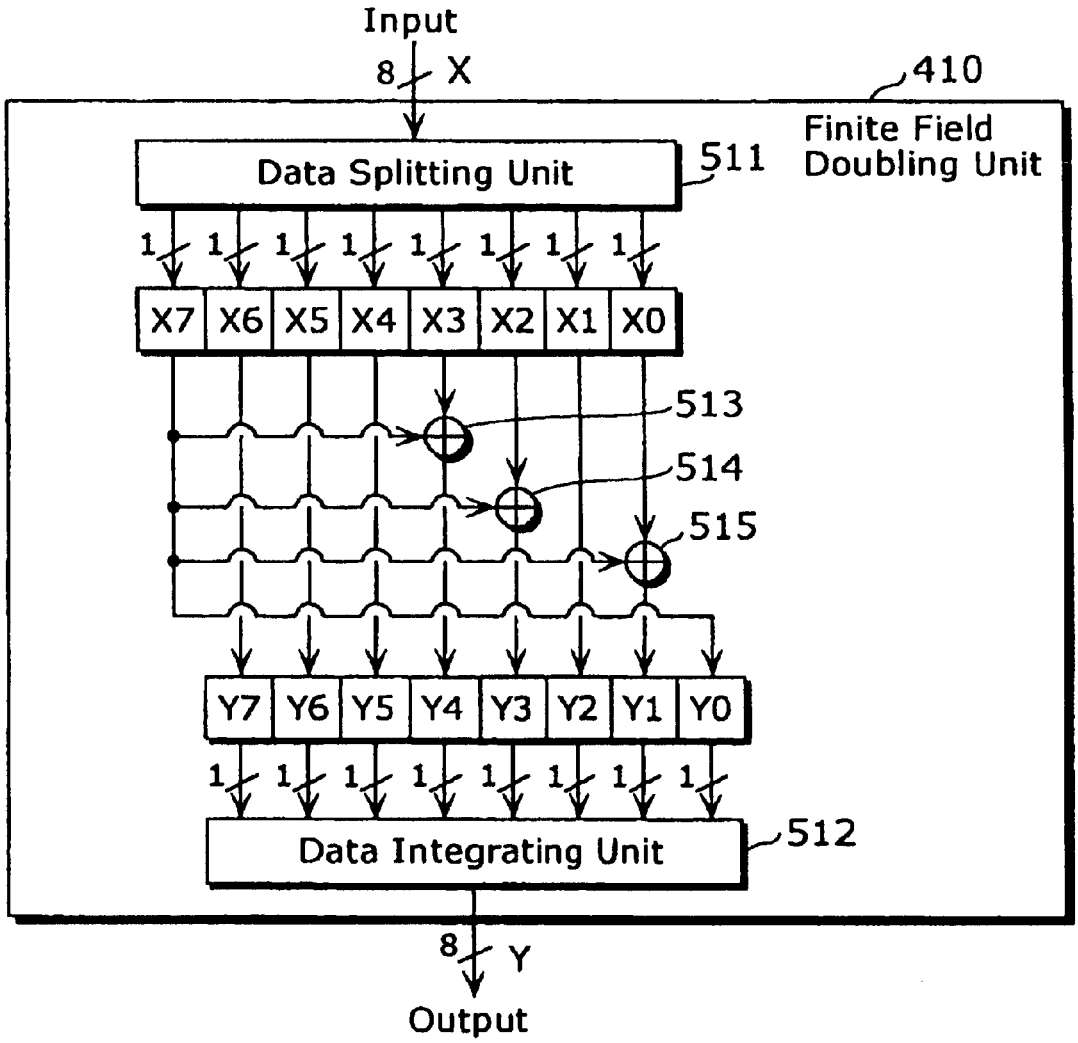
FIG. 8 is a block diagram showing an example of a configuration of a finite field doubling unit according to the embodiment of the present invention.

FIG. 8 is a diagram showing the internal configuration of the finite field doubling unit 410.

The finite field doubling unit 410 doubles the inputted 8 bit data X in the finite field GF ($2^8$) and outputs the 8 bit data Y as the result. It is composed of a data splitting unit 511, a data integrating unit 512 and data integrating units 513 to 515.

The data splitting unit 511 splits the input data into data for each 1 bit. The data integrating unit 512 integrates a plurality of input data into single data and outputs the integrated data. Each of the data integrating units 513 to 515 integrates two blocks of input data. Hereafter performances of the finite field doubling unit 410 are explained.

Firstly, the data splitting unit 511 splits the 8 bit input data X into one bit each from the high-ordered bit and outputs as data X7, X6, . . . , X0 from the high-ordered bit. Next, the data integrating unit 513 performs exclusive OR operation between the data X7 and data X3 and outputs the result as data Y4. The data integrating unit 514 performs exclusive OR operation between the data X7 and data X2 and outputs the result data Y3. The data integrating unit 515 performs exclusive OR operation between the data X7 and data X0 and outputs the result as data Y1. Also, the data X6, X5, X4, X1 and X7 are respectively denoted data Y7, Y6, Y5, Y2 and Y0. The data integrating unit 512 outputs, as output data of the finite field doubling unit 410, 8 bit data which data Y7, Y6, Y5, . . . , Y0 are integrated in this order from the high-ordered bit.

By denoting, for each bit X7, X6, . . . , and X0 composed of the 8 bit input data X:

$$Y7=X6$$

$$X6=X5$$

$$Y5=X4$$

$$Y4=X3(30\ )X7$$

$$Y3=X2(30\ )X7$$

$$Y2=X1$$

$$Y1=X0(30\ )X7$$

$$Y0=X7$$

the finite field doubling unit 410 calculates values of each bit Y7, Y6, . . . , and Y0 composed of the 8 bit output data Y. The output data Y herein indicates a result of doubling the input data X in the finite field GF ($2^8$). It is explained in the following.

The input data X is denoted by a following polynomial of $\alpha$ whose coefficient is the value in the finite field GF (2).

$$X7\times\alpha^7+6\times\alpha^6+\ldots+X1\times\alpha+X0$$

Herein, doubling in the finite field GF ($2^8$) means to multiply $\alpha$ to the above polynomial. Therefore, $$X7\times\alpha^8+X6\times\alpha^7+\ldots+X1\times\alpha^2+X0\times\alpha$$

Here, the primitive polynomial is $x^8+x^4+x^3+x+1$ so holds $\alpha^8=\alpha^4+\alpha^3+\alpha+1$. Therefore, the above polynomial is reconstructed to, $$X6\times\alpha^7+X5\times\alpha^6+X4\times\alpha^3+(X3+X7)\times\alpha^4+(X2+X7)\times\alpha^3+X1\times\alpha+(X0+X7)$$

This polynomial corresponds to:

$$Y7\times\alpha^7+Y5\times\alpha^6+\ldots+Y1\times\alpha+Y0$$

Thus, the reason why the processes by the finite field doubling unit 410 are performed is explained.

The data converters 1 and 2 perform following processes on the 64 bit input data X.

(1) Split the input data X into the high-ordered 32 bits and the low-ordered 32 bits and denote respectively data X0 and X1.

(2) Calculate $T0=(X0+K1)^3+(X1+K2)^3$ and $T1=(X0+K3)^3+(X1+K4)^3$. Note that the addition and multiplication herein are all calculated in the polynomial residue class ring which determines a value in the finite field GF ($2^8$) as a coefficient.

(3) Split the 32 bits data T0 into 8 bits data from the high ordered byte. The split data are respectively denoted data a0, a1, a2 and a3. Also, split the 32 bit data T1 into data blocks with 8 bits each from the high ordered byte. The split data are respectively denoted data b0, b1, b2 and b3.

(4) Calculate $G0=C1\times a0\ |C2|a1\ |C3\times a2|C4|a3$ and $G1=C5\times b0|C6\times b1|C7\times b2|C8\times b3$ and output G0|G1 as output data. Note that "|" indicates data concatenation and the above multiplications are all calculated in the finite field GF ($2^8$).

As clear from the equations (1) to (4), in the multiplication in the polynomial residue class ring with a value in the finite field GF ($2^8$) as a coefficient, even if a part of the input data is changed, the change influences all of the output data. For example, assume that the value of data X0 is changed in the equations (1) to (4). The data X0 is used in all of the equations (1) to (4). Therefore, the change influences all of the output data D0 to D3. The same thing applies to other values (X1 to X3, Y0 to Y3). Accordingly, in the present embodiment, a high probability of data confusion can be realized using the above multiplications for the converting processing. Next, in the present embodiment, an exponentiation is used instead of the multiplication of two or more variables (e.g. X×Y, X×Y×Z). This is because that, in the case of the multiplication of two or more variables, the result of the multiplication becomes always 0 if the value of any one of the variables is 0, that is, that there are many combinations of the value of input variables which lead the value of the multiplication result 0. Thus, a good confusion probability is not shown. On the other hand, in the case of the exponentiation, the calculation result only becomes 0 when the value of the input variable is 0. Therefore, a high probability of data is guaranteed without lowering the probability of data confusion as described above.

Furthermore, in the present embodiment, the calculation raised to cube is used. This results in the following reasons. First, when given a conversion such as $Y=X^2$ using the calculation in square, an output value for the input value $\alpha$ is $\alpha^2$. Next, an output value when a difference $\Delta$ is added to the input value $\alpha$ is $(\alpha+\Delta)^2=\alpha^2+\alpha\times\Delta+\Delta\times\alpha+\Delta^2$. Here, $\alpha\times\Delta=\Delta\times\alpha$ and $\alpha\times\Delta+\alpha\times\Delta=0$ (both are obvious from the calculation method in the finite field GF ($2^8$)). So, $(\alpha+\Delta)^2=\alpha^2+\Delta^2$. Therefore, a change value of the output value by adding the difference $\Delta$ to the input value is $\Delta^2$. That is, the change value of the output value become a constant output change value $\Delta^2$ regardless of the input value $\alpha$ so that it is not a preferred characteristic in terms of the data confusion. Consequently, it is necessary to use exponentiation at least in the cube or more. In the present embodiment, the exponentiation in cube is used since a converting processing load becomes higher as the exponentiation processing is more as the exponent is higher. Herein, $$\begin{aligned}(\alpha+\Delta)^3 &= (\alpha+\Delta)\times(\alpha+\Delta)\times(\alpha+\Delta)\\ &= (\alpha^2+\alpha\times\Delta+\Delta\times\alpha+\Delta^2)\times(\alpha+\Delta)\\ &= (\alpha^2+\Delta^2)\times(\alpha+\Delta)\\ &= \alpha^3+\Delta\times\alpha^2+\Delta^2\times\alpha+\Delta^3\end{aligned}$$

Therefore, in the case of the cubing operation, the output difference is not constant regardless of the input value $\alpha$ as in the squaring operation. Note that in the case where the exponent N for exponentiation is $N=2^k$ (k is an integer of 1 or more), the output value is $(\alpha+\Delta)\hat{}(2^k)=\alpha\hat{}(2^k)+\Delta\hat{}(2^k)$, being obtained by adding the input difference $\Delta$ to the input value a in exponentiation $X^N$ as the data converting processing. The following explains about that the output value becomes constant regardless of the input value. Here, "X^α" indicates X raised to the αth exponent.

When k=1, the exponent=2, therefore the output value based on the above explanation is $(\alpha+\Delta)^2=\alpha^2+\Delta^2$. Next, when k=m and the exponent=$2^m$, if $(\alpha+\Delta)\hat{}(2^m)=\alpha\hat{}(2^m)+\Delta(2^m)$ is hold, $(\alpha+\Delta)\hat{}(2^{m+1})=\{(\alpha+\Delta)\hat{}(2^m)\}^2=\{\alpha\hat{}(2^m)+\Delta\hat{}$ $(2^m)\}^2=\alpha(2^{m+1})+\Delta\hat{}(2^{m+1})$ is hold. Therefore, the above equation is hold when k=m+1. Accordingly, it is indicated that, by the mathematical induction, for an arbitral integer k which is one or larger, the equation $(\alpha+\Delta)\hat{}(2^k)=\alpha\hat{}(2^k)+\Delta\hat{}(2^k)$ is hold. Consequently, it is shown that the exponent can be a value other than $2^k$ (k is an integer of 1 or larger). That is, whereas 3 is used of the exponent in the present embodiment, the value may be the value of 3 or larger other than $2^k$ (k is an integer of 1 or larger) unless it does not mind to take some time for the processing in the data converter.

Also, in the present embodiment, an addition (exclusive OR operation) by a constant K is calculated before the exponentiation such as $(X+K)^3$. Here, by changing the constant K, many variations can be given to the converting processing in the data converter. For example, different converting processing can be used for authenticating each subject to be authenticated by using different constant K depending on the subject to be authenticated.

Herein, when the value of $(X+K)^3$ is 0 is only when X=Y. Therefore, a merit of guaranteeing high probability of data confusion is not lost by using the exponentiation as described.

Also, in the present embodiment, the same exponentiation in cube is performed on four data blocks of A0 to A3. However, it is not necessary to be in the same exponent but the exponent may be different from one another.

Further, the data converter according to the present embodiment uses an operation processing in the finite field GF $(2^8)$ for the processing which becomes a core for the data confusion. Therefore, a circuit can be shared with the operation circuit in the finite field GF $(2^8)$, being used for the error-correcting code circuit such as Reed-Solomon codes and Bose-Chaudhuri-Hocquenghem (BCH) codes. As the consequence, an implementation size in an appliance as a whole can be reduced and the appliance implementation in a compact circuit size is realized.

Note that each data size of the present invention is just an example and it can be beyond the data size. Also, the primitive polynomial and the residue polynomial according to the present embodiment are just examples. Therefore, the size is not limited to this.

Figure 9:
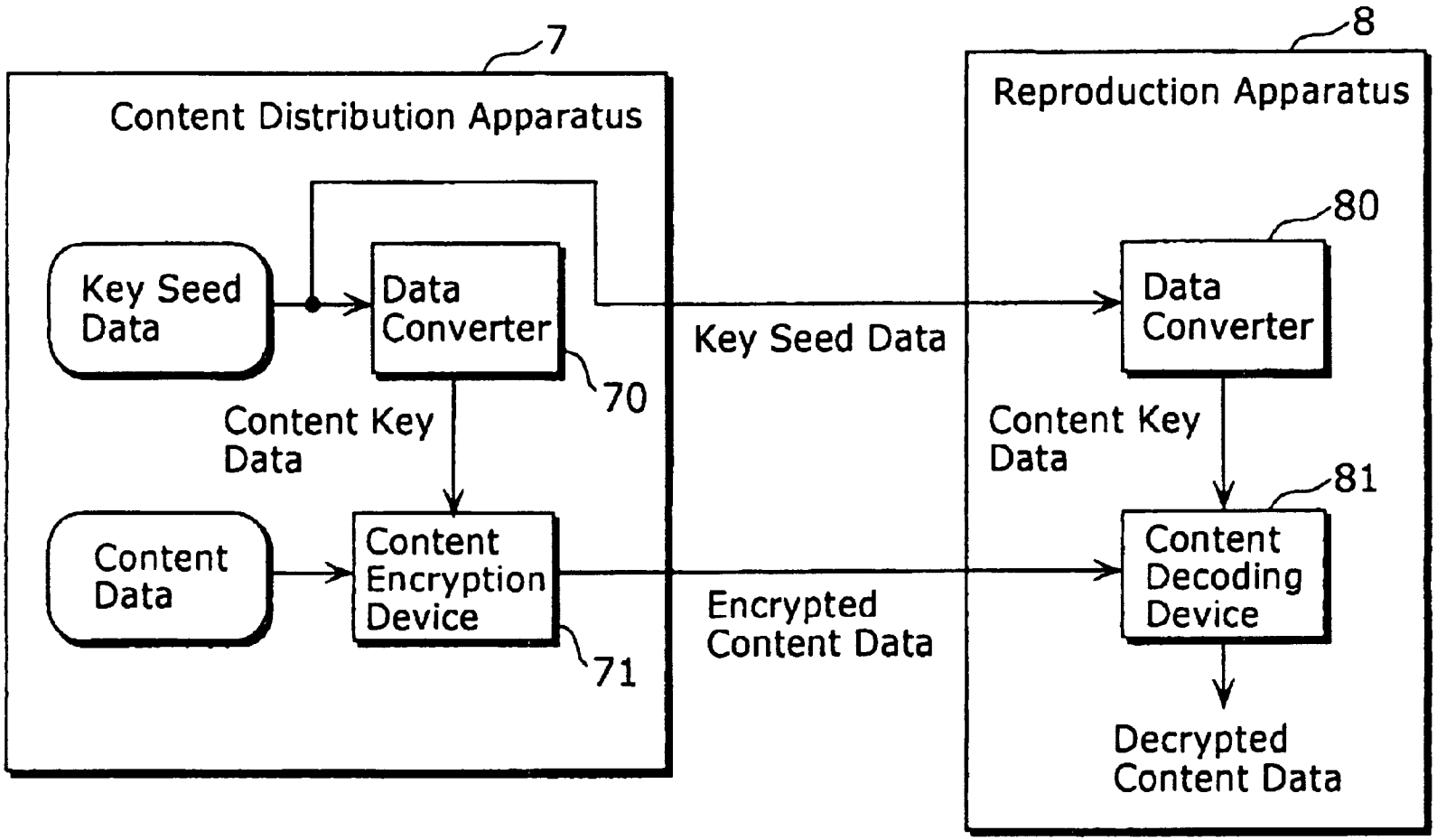
FIG. 9 is a block diagram showing an example of a system configuration in the case where the converter by the present invention is applied to a content distribution system.

Furthermore, the present embodiment describes about the case where the data converter is used in the authentication system. However, the data converter of the present embodiment can be used unless it uses a secret data converter. As other applied examples of using the data converter is that, for example, it can be applied to a content distribution system as shown in FIG. 9. The content distribution system is composed on a content distribution device 7 which distributes encrypted content via broadcasting or a network, and a reproduction device 8 which receives, decodes and reproduces the distributed encrypted content. The content distribution device 7 converts key seed data (data to be a seed for generating a content key) in the data converter 70 and generates the content key. The content encryption device 71 then encrypts the content data in plaintext and generates the encrypted content data. After the above processing, the content distribution device 7 sends the key seed data and the encrypted content data to the reproduction device 8. The reproduction device 8 which received the data firstly, in the data converter 8, converts the key seed data and generates the content key. Then, the content decoding unit 81 decodes the encrypted content data and obtains the content in plaintext. Only the reproduction device allowed to reproduce the content can prevent the content reproduction by an illegal reproduction device by mounting the same data converter which the content distribution device has.

Also, in the present embodiment, whereas fixed values K1 to K4 for integrating data in the data integration units 11a to 11d are previously fixed values, these fixed values may be inputted from outside of the data converter so that a user can freely set the values. Further, the constants C1 to C4 are also previously fixed values to be stored in the constant storing unit 22. However, these values may be also inputted from outside of the data converter so that the user can freely set the values.

Furthermore in the present embodiment, whereas the finite field GF $(2^8)$ is used as a finite field, other finite fields may be applied. For example, it may be the finite field GF $(2^n)$ (n is a natural number).

Note that each functional block in the block diagrams (FIG. 2 etc.) is typically realized as an LSI which is an integrated circuit. It may be separately constructed as one chip or may be constructed as one chip including a part or the whole of the integrated circuit.

Figure 10:
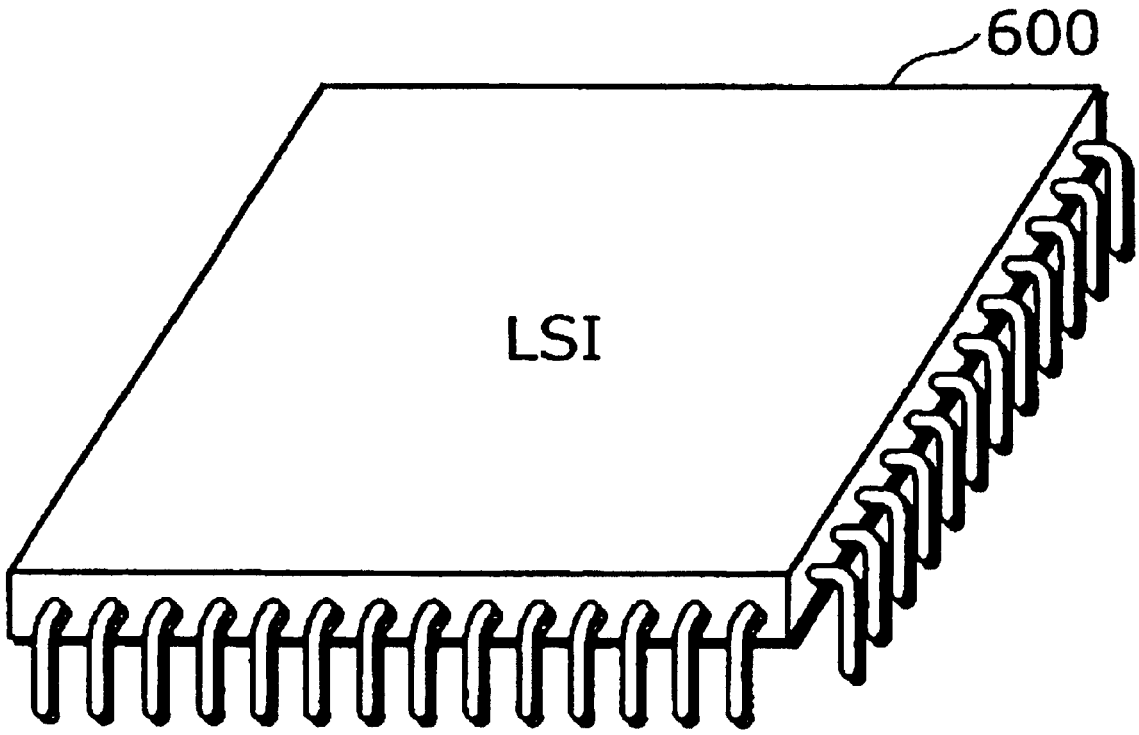
FIG. 10 is an outside drawing of an LSI of an error-correction/data converter.
Figure 11:
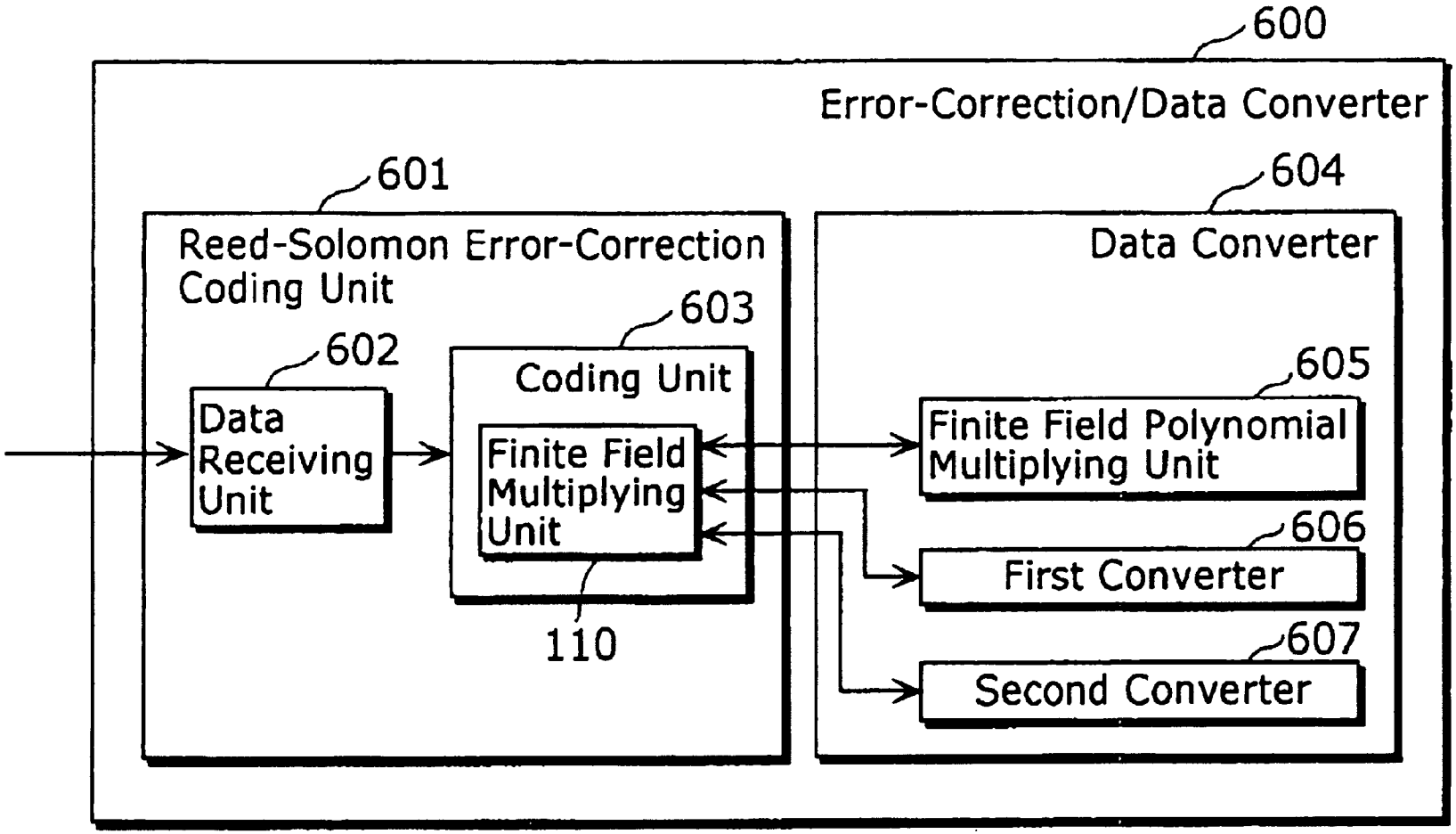
FIG. 11 is a block diagram showing an example of a configuration of the error-correction/data converter.

FIG. 10 is an outside drawing of the LSI of the error correction/data converter including a data converter having a similar function as that of the data converter shown in FIG. 2. FIG. 11 is a functional block diagram showing a configuration of the LSI of the error correction/data converter.

As shown in FIG. 11, the error correction/data converter 600 is an apparatus which performs data conversion after performing error correction coding on the data. It has a Reed-Solomon error correction coding unit 601 and a data converter 604.

The Reed-Solomon error correction coding unit 601 is a processing unit which performs Reed-Solomon error correction coding on the inputted data and output the coded data. It has a data receiving unit 602 and a coding unit 603. The data receiving unit 602 is a processing unit operable to receive data to be inputted from outside. The coding unit 603 is a processing unit which, responding to the data receiving unit 602, performs the Reed-Solomon error correction coding by performing the multiplication in the finite field GF $(2^n)$ on the data received at the data receiving unit 602. The coding unit 603 has a finite field multiplying unit 110 which performs multiplication in the finite field GF $(2^n)$ on the data. A configuration of the finite field multiplying unit 110 is as described above.

While the data converter 604 has a configuration similar to that of the data converter 1(2), it uses a finite field polynomial multiplying unit 605 in place of the finite field polynomial multiplying unit 100, a first converter 606 in place of the first converter 14, and a second converter 607 in place of the second converter 15. The finite field polynomial multiplying unit 605 differs from the finite field polynomial multiplying unit 100 in that it performs multiplication in the finite field GF $(2^n)$ using the finite field polynomial multiplying unit 110 set in the coding unit 603. Other configurations of the finite field polynomial multiplying unit 605 are same as those of the finite field polynomial multiplying unit 110. The first converter 606 differs from the first converter 14 in that it performs multiplication in the finite field GF $(2^n)$ using the finite field multiplying unit 110 set in the coding unit 603. Other configurations of the first converter 606 are same as those of the first converter 14. The second converter 607 differs from the second converter 15 in that it performs multiplication in the finite field GF $(2^n)$ using the finite field multiplying unit 110 set in the coding unit 603. Other configurations of the second converter 607 are same as those of the second converter 15.

Accordingly, the Reed-Solomon error correction coding unit 601 and the data converter 604 can share the finite field multiplying unit 110. Therefore, a circuit scale of the LSI can be reduced.

Here, the error correction/data converter 600 is realized by the LSI. However, it may be called as IC, system LSI, super LSI and ultra LSI depending on the difference of the integration density.

In addition, a method of constructing the integrated circuit is not limited to the LSI. It can be realized by a special circuit or a general processor. A Field Programmable Gate Array (FPGA) capable of programming and a reconfigurable processor capable of reconfiguring a connection and a setting of the circuit cell inside the LSI after manufacturing the LSI may be used.

Furthermore, if a technique of constructing the integrated circuit which can be replaced of the LSI according to the development of the semiconductor technology and an emerging technology is introduced, the functional block may be of course integrated using the newly introduced technique. As another technology, it is possible that a biotechnology and the like may be used.

Although only an exemplary embodiment of this invention has been described in detail above, those skilled in the art will readily appreciate that many modifications are possible in the exemplary embodiment without materially departing from the novel teachings and advantages of this invention. Accordingly, all such modifications are intended to be included within the scope of this invention.

INDUSTRIAL APPLICABILITY

The data converter according to the present invention can reduce a scale of a circuit as a whole including a data converter by sharing a data conversion with an error correction coding circuit. Therefore, for example, it is useful for an apparatus having a function of authenticating a communication partner via a communication channel. Also, not only limited to this example, this invention applies to any apparatuses unless they need to mount any kind of a data conversion circuit.

What is claimed is:

1. A data converter comprising:

[a splitting] *an obtaining* unit operable to [split input data into] *obtain* a plurality of data blocks;

a conversion performing unit operable to perform conversion on each one of the plurality of data blocks, the conversion being based on an exponentiation [to a predetermined exponent] in a polynomial residue class ring with a value in a finite field GF ($2^n$) *as a coefficient*, the n being a natural number, [as a coefficient;] *and the exponentiation using a predetermined value as an exponent;* and an output data generating unit operable to generate output data based on the plurality of data blocks converted by the conversion performing unit, wherein the predetermined [exponent] *value* is a value that is 3 or larger and other than $2^m$, the m being an integer which is 1 or larger.

2. The data converter according to claim 1, further comprising a finite field multiplying unit operable to perform multiplication in the finite field GF ($2^n$), wherein the conversion performing unit performs exponentiation using the finite field multiplying unit.

3. The data converter according to claim 1, wherein the conversion performing unit includes:

an adding subunit operable to add, in the polynomial residue class ring, a predetermined constant and each one of the plurality of data blocks [split by the splitting unit,] *obtained by the obtaining unit,* the predetermined constant being the same or variable depending on said each data block; and a conversion performing subunit operable to perform conversion on said each one of the plurality of data blocks to which the constant is added by the adding subunit, the conversion being based on the exponentiation [to the predetermined exponent] in the polynomial residue class ring.

4. The data converter according to claim 1, wherein the output data generating unit includes:

an adding subunit operable to perform addition in the polynomial residue class ring among the plurality of data blocks converted by the conversion performing unit; and a multiplying subunit operable to multiply, in the finite field GF ($2^n$), a result of the addition by the adding subunit by a predetermined constant.

5. The data converter according to claim 4, further comprising a finite field multiplying unit operable to perform multiplication in the finite field GF ($2^n$), wherein the conversion performing unit performs exponentiation using the finite field multiplying unit, and the multiplying subunit performs multiplication using the finite field multiplying unit.

6. A data conversion/method comprising:

[splitting input data into] *obtaining* a plurality of data blocks;

performing conversion on each one of the plurality of data blocks, the conversion being based on an exponentiation [by a predetermined exponent] in a polynomial residue class ring with a value in a finite field GF ($2^n$) *as a coefficient*, the n being a natural number, [as a coefficient;] *and the exponentiation using a predetermined value as an exponent;* and generating output data based on the plurality of data blocks converted by the conversion performance, wherein the predetermined [exponent] *value* is a value that is 3 or larger and except $2^m$, the m being an integer which is 1 or larger.

7. The data conversion method according to claim 6, wherein in the conversion performance, the exponentiation is performed using a finite field multiplying unit operable to perform multiplication in the finite field GF ($2^n$).

8. The data conversion method according to claim 6, wherein the conversion performance includes:

adding, in the polynomial residue class ring, a predetermined constant and each one of the plurality of [split] data blocks, the predetermined constant being the same or variable depending on said each data block; and performing conversion on said each one of the plurality of data blocks to which the constant is added by the addition, the conversion being based on [an] *the* exponentiation [to a predetermined exponent] in the polynomial residue class ring.

9. The data conversion method according to claim 6, wherein the output data generation includes:

performing addition in the polynomial residue class ring among the plurality of data blocks converted by the conversion performance; and multiplying, in the finite field GF ($2^n$), a result of the addition by a predetermined constant.

10. The data conversion method according to claim 9, wherein in the conversion performance, the exponentiation is performed using a finite field multiplying unit operable to perform multiplication in the finite field GF ($2^n$); and in the multiplication, the multiplication is performed using the finite field multiplying unit operable to perform multiplication in the finite field GF ($2^n$).

11. An integrated circuit comprising:

a finite field multiplying unit operable to perform multiplication in a finite field GF ($2^n$), the n being a natural number;

an error-correction coding unit operable to perform error-correction coding on input data by performing multiplication in the finite field GF ($2^n$) using the finite field multiplying unit;

a splitting unit operable to split the input data into a plurality of data blocks;

a conversion performing unit operable to perform conversion on each one of the plurality of data blocks, the conversion being based on an exponentiation [to a predetermined exponent] in a polynomial residue class ring with a value in the finite field GF ($2^n$) as a [coefficient;] *coefficient, and the exponentiation using a predetermined value as an exponent;* and

[generating] *an output data generating unit operable to generate* output data [unit] based on the plurality of data blocks converted by the conversion performing unit, wherein the predetermined [exponent] *value* is a value that is 3 or larger and other than $2^m$, the m being an integer that is 1 or larger.

12. The integrated circuit according to claim 11, wherein the conversion performing unit includes:

an adding subunit operable to add, in the polynomial residue class ring, a predetermined constant and each one of the plurality of data blocks split by the splitting unit, the predetermined constant being the same or variable depending on said each data block; and a conversion performing subunit operable to perform conversion, using the finite field multiplying unit, on said each one of the plurality of data blocks to which the constant is added by the adding subunit, the conversion being based on the exponentiation [to a predetermined exponent] in the polynomial residue class ring.

13. The integrated circuit according to claim 11, wherein the output data generating unit includes:

an adding subunit operable to perform addition in the polynomial residue class ring among the plurality of data blocks converted by the conversion performing unit; and a multiplying subunit operable to multiply, in the finite field GF ($2^n$), the result of the addition by the adding subunit by a predetermined constant using the finite field multiplying unit.

14. A program *recorded on a computer readable medium* that causes a computer to execute *a method comprising*:

[splitting input data into] *obtaining* a plurality of data blocks;

performing conversion on each one of the plurality of data blocks using a finite field multiplying unit operable to perform multiplication in a finite field GF ($2^n$), the n being a natural number, the conversion being based on an exponentiation [to a predetermined exponent] in a polynomial residue class ring with a value in the finite field GF ($2^n$) as a [coefficient;] *coefficient, and the exponentiation using a predetermined value as an exponent;* and generating output data based on the plurality of data blocks converted by the conversion performance, wherein the predetermined [exponent] *value* is a value that is 3 or larger and other than $2^m$, the m being an integer which is 1 or larger.

15. The program according to claim 14, wherein the conversion performance includes:

adding, in the polynomial residue class ring, a predetermined constant and each one of the plurality of [the split] data blocks, the predetermined constant being the same or variable depending on said each data block; and performing conversion on said each one of the plurality of data blocks added by the addition using the finite field multiplying unit, the conversion being based on [an] *the* exponentiation [to a predetermined exponent] in the polynomial residue class ring.

16. The program according to claim 14, wherein the output data generation includes:

performing addition in the polynomial residue class ring among the plurality of data blocks converted by the conversion performance; and multiplying, in the finite field GF ($2^n$), a result of the addition by a predetermined constant using the finite field multiplying unit.

* * * * *